Sept. 10, 1935.   G. K. GARRETT   2,014,231
WASHER
Filed Dec. 20, 1933
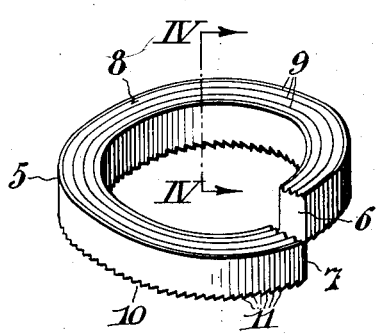
FIG. I.
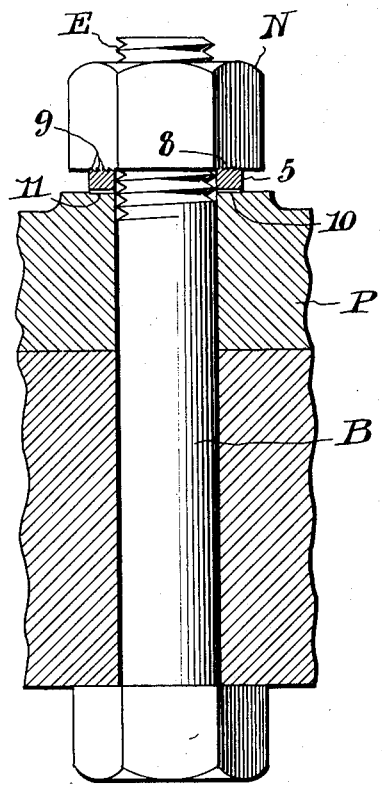
FIG. V.
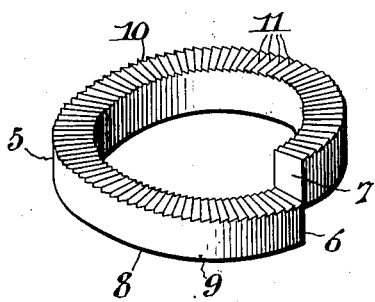
FIG. II.
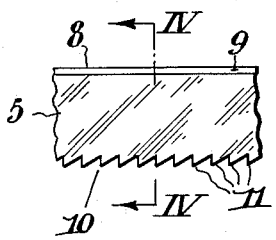
FIG. III.
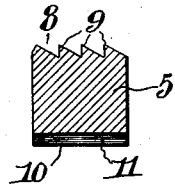
FIG. IV.
INVENTOR:
George K. Garrett, Patented Sept. 10, 1935

2,014,231

UNITED STATES PATENT OFFICE 2,014,231

WASHER

George K. Garrett, Bryn Mawr, Pa.

Application December 20, 1933, Serial No. 703,204

2 Claims. (Cl. 151—36)

This invention relates to washers; and it has reference more especially to nut lock washers of the split helical spring variety.

Washers of the kind referred to, as ordinarily made have plain smooth side faces and are therefore apt to slip and spread particularly when the bolt nuts with which the washers are used in association, are tightened with high speed power wrenches after the practice now followed in the assembling of automobiles and other machinery on a production basis. Spreading and resultant deformation of the washers entails the removal of the nuts and in some cases of the bolts also for the purpose of replacing the washers, with consequent loss of time and interruption of the assembling process.

My invention has for its object the elimination of the aforementioned difficulties. In other words, I aim to provide a split spring washer which is immune against slipping or spreading during tightening of the bolt washers, and which moreover can be depended upon subsequently for increased gripping power to prevent the nuts from loosening when the bolts are subjected to strain or vibration.

In the drawing herewith, Fig. I is a perspective view of a split helical lock washer conveniently embodying my invention with the washer positioned to show one of its faces.

Fig. II is another perspective view of the washer positioned to show the other face thereof.

Fig. III is a fragmentary edge view of the washer drawn to a larger scale.

Fig. IV is a cross sectional view taken as indicated by the arrows IV—IV in Figs. I and III, and likewise drawn to a larger scale; and, Fig. V is an illustration showing how the washer is used in association with a nut and bolt.

As herein delineated, my improved washer, which I have designated by the numeral 5, is fashioned to helical configuration from metallic stock of substantially rectangular configuration with the split ends 6 and 7 displaced in approximately vertical alignment. The face 8 of the washer uppermost in Fig. I, it will be observed, is formed with sharp laterally-spaced concentric circumferential biting ridges 9, which, see Fig. IV, are all pitched in one direction, i. e. inwards toward the axis of the washer 5, and which have a cross sectional profile preferably resembling that of saw teeth. The opposite face 10 of the washer 5 uppermost in Fig. II, on the other hand, is formed with sharp circumferentially-spaced radial biting ridges 11, which, as best shown in Fig. III, are all pitched in one direction and like the teeth 9 have a saw tooth profile configuration. In the illustrated instance, the ridges 9 and 11 are uniformly spaced, but they may, if found desirable or expedient, be variantly spaced without detraction from the functioning of the washer in the manner about to be explained.

In use, the washer 5 with its circumferentially-ridged face 8 uppermost is slipped, as exemplified in Fig. V, over threaded end E of the bolt B, whereupon the nut N is applied to said bolt. As the nut N is tightened, the washer 5 is compressed until its opposite sides 8 and 10 assume a parallel relation with the bottom face 10 bearing flat against the contiguous surface of the part P which is being secured, and the upper side 8 bearing flat against the contiguous bottom face of the nut N.

When the nut N initially contacts and commences to compress the washer 5, the first radial biting ridge 11, adjoining the split end 7, is forced into the surface of the part P simultaneously with similar biting of the several concentric ridges 9, adjoining the split end 6, into the nut N. As compression of the washer 5 proceeds, the radial biting ridges 11 serve to prevent rotation of the washer 5, thus causing the concentric ridges 9 to cut their way into the nut because of their relative motion, which would not be the case if the under surface of the washer were flat. Moreover, the concentric ridges 9 serve to prevent expansion as compression of the washer takes place, thus causing the radial ridges 11 to become embedded more firmly in the nut than would be the case if the upper surface of the washer were flat. Accordingly, the circular ridges on the one surface and the radial ridges on the other surface function in combination and cumulatively to increase steadily the resistance of the washer to spreading and to rotation relatively to the part P. Incident to this operation, it will be seen that the concentric ridges 9 by virtue of their directional pitch and sharpness will bite into the bottom face of the nut N and thereby effectively prevent spreading of the washer 5; while the radial ridges 11 due to their directional pitch and sharpness will bite into the surface of the part 10 and thereby effectively prevent rotation of said washer. After being fully tightened, the nut N is obviously prevented from working loose through jarring or vibration of the bolt B by the combined action of the circumferential and radial biting ridges 9 and 11 of the washer 5.

Having thus described my invention, I claim:

1. As a new article of manufacture, a helical split spring lock washer having on one face thereof concentric circumferential ridges of sharp configuration, all pitched in a direction to preclude spreading of the washer, and on the other face radial ridges likewise of sharp configuration and all pitched in a direction to prevent rotation of said washer.

2. As a new article of manufacture, a split spring nut lock washer having, on one face thereof, concentric circumferential ridges of sharp saw tooth configuration pitched inwards toward the washer axis and adapted to bite into the bottom surface of the nut as the latter is tightened, and radial ridges of sharp saw tooth profile configuration in the other face thereof adapted to bite into the surface of the part which is to be secured by the nut, the last mentioned ridges being pitched so as to resist turning of the washer by the nut during tightening of the latter.

GEORGE K. GARRETT.